United States Patent [19]

Kawai et al.

[11] Patent Number: 4,662,243
[45] Date of Patent: May 5, 1987

[54] POWER TRANSMISSION APPARATUS WITH TWO-PHASE TYPE TORQUE CONVERTER

[75] Inventors: Hideaki Kawai, Kyoto; Kiyoharu Murakami, Neyagawas, both of Japan

[73] Assignee: Kabushiki Kaisha Daikin Seisakusho, Osaka, Japan

[21] Appl. No.: 701,252

[22] Filed: Feb. 13, 1985

[30] Foreign Application Priority Data

Feb. 28, 1984 [JP] Japan .................................. 59-37657

[51] Int. Cl.⁴ ............................................. F16H 47/06
[52] U.S. Cl. ........................................ 74/731; 74/677; 74/688; 74/732
[58] Field of Search ................ 74/688, 730, 731, 677, 74/732; 192/3.23, 3.24

[56] References Cited

U.S. PATENT DOCUMENTS

| | | | |
|---|---|---|---|
| 2,738,689 | 3/1956 | Dodge | 192/3.23 X |
| 3,073,181 | 1/1963 | Kronogard | 74/730 X |
| 3,270,585 | 9/1966 | Livezey | 74/688 X |
| 3,435,707 | 4/1969 | De Julian | 74/688 X |

FOREIGN PATENT DOCUMENTS

| | | | |
|---|---|---|---|
| 2627844 | 1/1977 | Fed. Rep. of Germany | 74/688 |
| 181784 | 12/1962 | Sweden | 74/688 |

Primary Examiner—Leslie Braun
Assistant Examiner—Dwight G. Diehl

[57] ABSTRACT

A power transmission apparatus with a two-phase type torque converter having a first stator capable of being selectively coupled to an output shaft, a fixed second stator, a brake which may be applied to fix the first stator, and a clutch for selectively connecting the first stator and the output shaft when the brake is in a released state.

5 Claims, 3 Drawing Figures

4,662,243

POWER TRANSMISSION APPARATUS WITH TWO-PHASE TYPE TORQUE CONVERTER

BACKGROUND OF THE INVENTION

This invention relates to a power transmission apparatus with two-phase type torque converter which may be favorably used in contruction machinery or the like where a large torque ratio is required.

In the case of a two-phase type torque converter having a first stator coupled to the output shaft and a second one fixed firmly, it is conventionally known well that a greater torque ratio than in the single phase type can be obtained by utilizing the reaction of the first stator so as to improve the working efficiency of construction machinery or the like and also to alleviate the speed change operation of the operator.

In FIG. 1 which shows a conventional composition of a two-phase type torque converter, a turbine 12 of a torque converter 11 is coupled to an output shaft 16 by way of central shaft 13 and gears 14, 15. A first stator 17 is coupled to a tube shaft 19 which is concentric with the shaft 13 by way of one-way clutch 18, while the tube shaft 19 is coupled to the output shaft 16 by way of gears 20, 21. A second stator 22 is fixed to a transmission casing 23.

In this conventional composition, however, when descending a steep slope under engine braking, the following problem occurs. That is, when the output rotating speed increases due to the inertial force of the vehicle, the one-way clutch 18 is disengaged automatically, so that the engine braking may be rendered ineffective. Or the car speed may fluctuate due to changeover of the idling and fixed states of the one-way clutch 18.

In this conventional composition, furthermore, while a great torque ratio is obtained, the transmission efficiency may be lowered in the idling region of the first stator 17 (in the high speed ratio region).

This invention possesses the following objects (a) and (b).

(a) To present a power transmission apparatus with two-phase type torque converter capable of enhancing the engine braking performance and preventing car speed fluctuations at the same time.

(b) To present a power transmission apparatus with two-phase type torque converter having high torque ratio and high transmission efficiency.

To achieve said objects, this invention, in a power transmission apparatus with two-phase type torque converter having a first stator coupled to the output shaft and a second one fixed firmly, is provided with a brake to fix the first stator and a clutch to disconnect between the first stator and the output shaft when said brake is in a released state.

DETAILED DESCRIPTION OF THE INVENTION

Figures 1, 2:
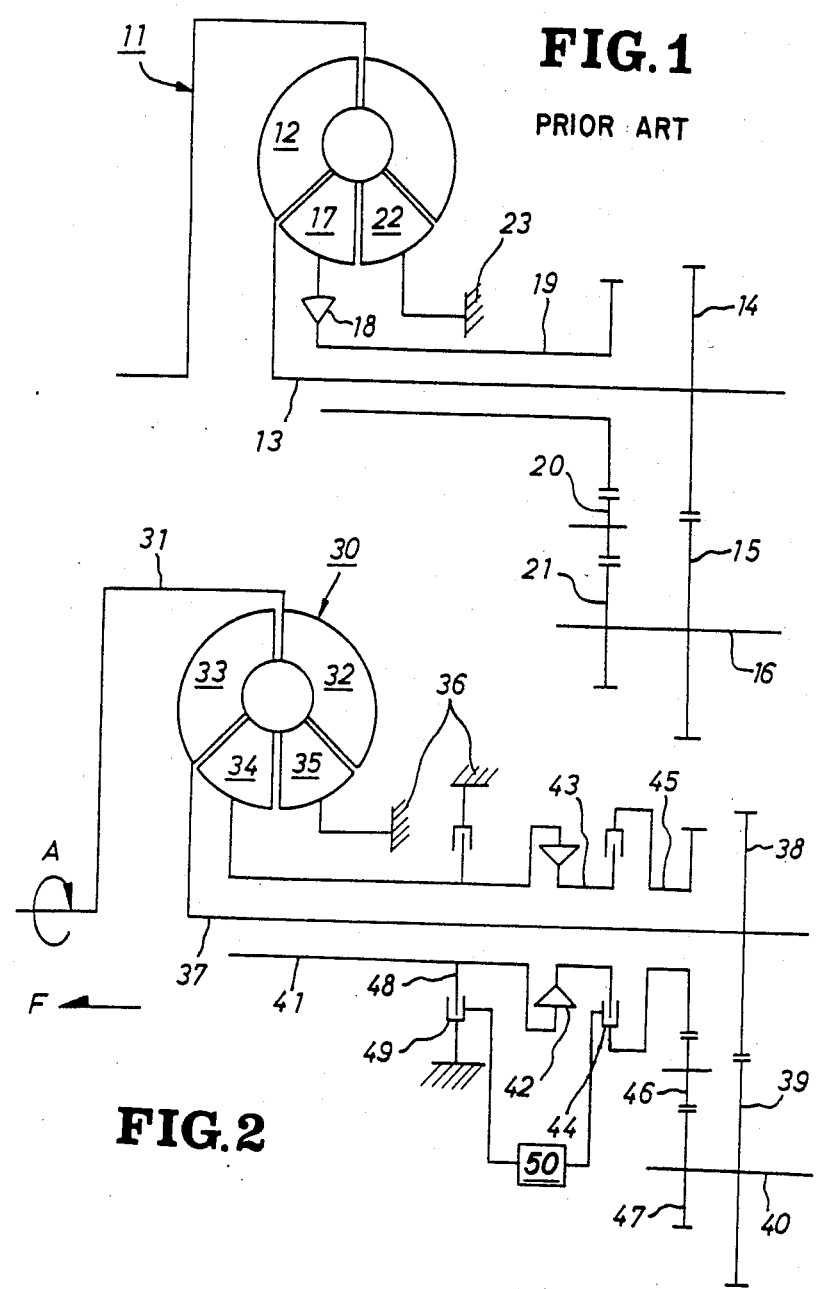
FIG. 1 is a partial layout drawing of a conventional power transmission apparatus.
FIG. 2 is a partial layout drawing of a power transmission apparatus conforming to the present invention.

In FIG. 2 (arrow F directs forward), a torque converter housing 31 of a torque converter 30 is coupled to the engine side (not shown), and a concentric impeller 32 is fixed to the rear end of the torque converter housing 31. In the space formed inside between the torque converter housing 31 and impeller 32, a turbine 33 is concentrically disposed in a position to confront the impeller 32. A first stator 34 and a second stator 35 having nearly identical radius are concentrically arranged side by side between the impeller 32 and turbine 33, and the second stator 35 is fixed to the side of transmission casing 36.

The internal peripheral part of the turbine 33 is coupled to a shaft 37 which is disposed in the center, and the shaft 37 is connected to an output shaft 40 by way of gears 38, 39. On the other hand, the internal peripheral part of the first stator 34 is coupled by way of spline fitting or the like, to a tube shaft 41 disposed concentrically at the outer circumferential part of the shaft 37, and the tube shaft 41 is coupled to another concentric tube shaft 43 at its rear end by way of a one-way clutch 42. The rear end of the tube shaft 43 is coupled to a further different concentric tube shaft 45 by way of a clutch 44, and the gear provided on the tube shaft 45 is coupled to the output shaft 40 by way of gears 46, 47. A brake disc 48 provided on the outside of the tube shaft 41 is designed to be fixed or released by a brake 49 secured to the transmission casing 36.

The operation goes as follows. In the first place, when using as a two-phase torque converter, the brake 49 is cut off (released) and the clutch 44 is engaged (connected). The torque from the engine in the arrow A direction is transmitted to the turbine 33 through the torque converter housing 31, impeller 32, and working fluid in the torque converter 30, and is further transmitted to the output shaft 40 from the turbine 33 by way of the shaft 37 and gears 38, 39. In the low speed ratio region, the anti-A direction torque the first stator 34 receives is transmitted to the output shaft 40 by way of the tube shaft 41, one-way clutch 42, tube shaft 43, clutch 44, tube shaft 45, and gears 46, 47 provided on the tube shaft 45. If the speed ratio increased in this state, the torque from the working fluid the first stator 34 receives is inverted, but in this case, since the one-way clutch 42 idles, the operation is same as in the conventional power transmission apparatus as mentioned earlier.

When using as a single-phase torque converter, on the other hand, the clutch 44 is disengaged and the brake 49 is applied. In this case, since the first stator 34 is in fixed state and the torque the first stator 34 receives in the low speed ratio region is not transmitted to the output shaft 40, a large torque ratio with high efficiency as obtained in the two-phase torque converter cannot be achieved. In this case, however, since the first stator 34 does not idle in the high speed ratio region, the torque transmission efficiency is high. Or when descending a steep slope with an engine brake, the one-way clutch 42 will not be cut off automatically due to the inertial force of the vehicle, so that the engine brake remains effective. Or car speed fluctuation does not occur due to changeover of one way clutch 42 between an idling state and a fixed state.

Thus, the present power transmission apparatus possesses two functions, which may be selectively used either manually or automatically depending on the working and operating conditions.

For automatic control, electric control, hydraulic control or air control may be possible, schematically shown at 50 in FIG. 2, and in particular the following control method is effective in this case.

Figure 3:
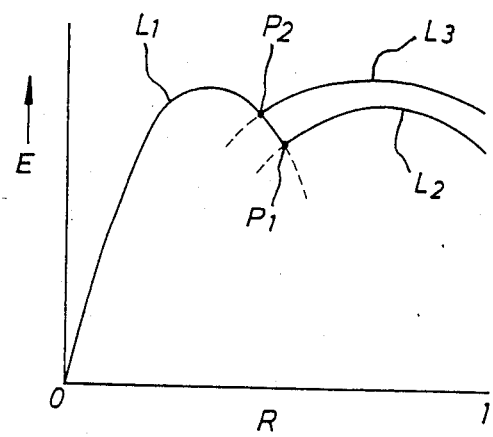
FIG. 3 is a graph showing the relationship between speed ratio and transmission efficiency.

FIG. 3 shows the relationship between speed ratio R and transmission efficiency E, in which curve L1 refers to the relation in a relatively low speed ratio region where the clutch 44 is engaged, brake 49 is disconnected, and the torque the first stator 34 is receiving is positively supplied to the output shaft 40, and curve L2 refers to the relation in a relatively high speed ratio region in the same state. The intersection P1 of curves L1 and L2 indicates the inverting point of the torque the first stator 34 receives from the working fluid, and the first stator 34 idles in a speed ratio R higher than point P1. Curve L3 refers to the relation in a relatively high speed ratio region where the clutch 44 is disengaged and the brake 49 is applied.

Therefore, as is clear from FIG. 3, the highest efficiency is obtained when controlled to use the clutch 44 in an ON state and the brake 49 in an OFF state at a speed ratio R lower than the intersection P2 of L1 and L3, and to keep the first stator 34 in a fixed state by cutting off the clutch 44 and turning on the brake 49 when exceeding the intersection P2. In this case, a high torque ratio with excellent efficiency is obtained in the low speed ratio region, and a high transmission efficiency is obtained in the high speed ratio region.

This invention, being equipped with the brake 49 to fix the first stator 34, and the clutch 44 to connect the first stator 34 and the output shaft 40 when this brake 49 is in a released state, provides the following effects (a) and (b):

(a) A power transmission apparatus with two-phase type torque converter capable of enhancing the engine brake performance and preventing car speed fluctuation at the same time can be obtained.

(b) A power transmission apparatus with two-phase type torque converter having high torque ratio and high transmission efficiency can be obtained.

This invention is not limited to said embodiment alone, but may be applied to the following cases (a), (b) within the claimed range.

(a) The one-way clutch 42 may be omitted. In this case, however, if the torque from the working fluid the first stator 34 receives in the high speed ratio range is inverted, it must be controlled so that the clutch 44 may be disengaged.

(b) The clutch 44 and brake 49 are not limited to a disc type, but, for example, a planetary gear type may be employed.

What is claimed is:

1. A power transmission apparatus with two-phase type torque converter using a working fluid having a first stator capable of being selectively coupled to an output shaft, and a fixed second stator, which comprises a brake means which may be applied to fix the first stator, and a clutch means for connecting the first stator and the output shaft when said brake means is in a released state, means for causing (a) said clutch means to operate to cut off the connection between said first stator and said output shaft when the torque the first stator receives from the working fluid is inverted, and (b) said brake means to be applied to fix the first stator.

2. A power transmission apparatus with two-phase type torque converter as set forth in claim 1, wherein a one-way clutch is provided at the end of a shaft which is used to couple said first stator to the output shaft.

3. A power transmission apparatus with two-phase type torque converter as set forth in claim 1, wherein said clutch means is provided on a tube shaft coupled to the output shaft through a gear train.

4. A power transmission apparatus with two-phase type torque converter as set forth in claim 1, wherein said brake means is fixed to a transmission case and is provided mediately a shaft coupling the first stator to the output shaft.

5. A power transmission apparatus with two-phase type torque converter as set forth in claim 1, wherein said clutch means and brake means are of a disc type.

* * * * *